United States Patent [19]
King

[11] 3,884,862
[45] May 20, 1975

[54] ADHESIVE COMPOSITION AND METHOD OF MAKING SAME

[75] Inventor: Kenneth Francis King, Wilmington, Del.

[73] Assignee: E. I. du Pont de Nemours & Company, Wilmington, Del.

[22] Filed: Feb. 9, 1972

[21] Appl. No.: 224,911

Related U.S. Application Data

[63] Continuation-in-part of Ser. No. 37,842, May 15, 1970, abandoned, which is a continuation-in-part of Ser. No. 26,772, April 8, 1970, abandoned.

[52] U.S. Cl. ........ 260/29.3; 117/138.8 A; 156/335; 260/38; 260/42.55; 260/42.56; 260/846
[51] Int. Cl. ............................................. C08g 51/24
[58] Field of Search ............ 260/29.3, 846, 838, 38, 260/41.5 R, 42.55; 156/335; 117/138.8 A

[56] References Cited
UNITED STATES PATENTS

| | | | |
|---|---|---|---|
| 3,298,984 | 1/1967 | Rye | 260/29.3 |
| 3,311,151 | 3/1967 | Willis et al. | 260/29.3 |
| 3,331,804 | 7/1967 | Fogiel | 156/335 |
| 3,405,754 | 10/1968 | Georges et al. | 260/54 |
| 3,480,066 | 11/1969 | Meredith | 156/335 |

*Primary Examiner*—Lorenzo B. Hayes

[57] ABSTRACT

A liquid adhesive composition having beneficial utility as a tire cord adhesive can be prepared by (1) dry milling an elastomer which is a copolymer of ethylene and at least one other monomer including a diene with a reinforcing carbon black so that the weight ratio of dispersed carbon black to elastomer is about 25:75 to 50:50; (2) adding an organic solvent for the elastomer and mixing to form a liquid composition, (3) mixing the liquid composition in a high-shear mixer with water containing an emulsifying agent to form an emulsion, (4) removing the organic solvent to form a latex, and (5) mixing with the latex a resorcinol-aldehyde resin component so that the elastomer:resin weight ratio is about 50:50 to 91:9.

5 Claims, No Drawings

ADHESIVE COMPOSITION AND METHOD OF MAKING SAME

CROSS-REFERENCE TO RELATED APPLICATIONS

This is a continuation-in-part of patent application Ser. No. 37,842 filed May 15, 1970 (now abandoned); Serial No. 37,842 was a continuation-in-part of patent application Ser. No. 26,772 filed on Apr. 8, 1970 (now abandoned).

BACKGROUND OF THE INVENTION

This invention relates to a liquid adhesive composition adapted for use in the manufacture of composite adhesivecoated reinforcing cords or other fibrous components for use in the manufacture of reinforced rubber articles. The invention also concerns a method of making the adhesive composition, and it concerns cords and other fibrous reinforcing components having a dried coating of the composition.

The industries which manufacture automobile tires and other rubber articles containing fibrous reinforcing components such as cords or fabrics are in need of a better means of providing good adhesion between the fibrous reinforcing components and the layers of rubber cured in contact therewith, particularly when the rubber layers are made of an elastomeric terpolymer of ethylene, propylene and a diene. This is especially true in applications requiring the use of fibrous components made of nylon and requiring a high level of adhesion as measured in a dynamic adhesion test as well as in a static adhesion test. It is also true in applications requiring the use of rayon fibrous components and requiring a bonding means which will cause no harmful tendering of the rayon components.

SUMMARY OF THE INVENTION

Expressed broadly, the present invention provides a liquid adhesive composition comprising A. water,
B. in solution in A, a resorcinol-aldehyde resin component selected from the group:
(B-1). a mixture of resorcinol and an aldehyde capable of forming a heat-hardenable resin, the resorcinol:aldehyde molar ratio being about 1:0.5 to 1:2, and
B-2. a heat-hardenable resin made from a mixture as defined in B-1,
C. dispersed in A as particles of a latex, in an amount such that the weight ratio of C:B is about 50:50 to 91:9, an elastomer which is a copolymer of ethylene and at least one other monomer including a nonconjugated diene copolymerizable with ethylene to form an elastomer, and
D. dispersed in A, a reinforcing carbon black in an amount such that the weight ratio of D:C is about 25:75 to 50:50.

The invention also provides a composite reinforcing cord for a rubber article comprising a fibrous cord substrate and an adherent coating thereon of a composition comprised of a resorcinol-aldehyde resin component as defined in (B) above, an elastomer as described in (C) above, and a reinforcing carbon black; the weight ratio of said elastomer to said resin being about 50:50 to 91:9, and the weight ratio of the carbon black to the elastomer being about 25:75 to 50:50. Also provided by the present invention is a process for preparing a liquid adhesive composition which comprises 1. dry milling an elastomer as described in (C) above with a reinforcing carbon black until the carbon black is substantially uniformly dispersed in the elastomer, the weight ratio of the carbon black to the elastomer being about 25:75 to 50:50,
2. mixing the resulting milled blend with an organic solvent for the elastomer until the elastomer is in solution in the solvent and a liquid composition is formed,
3. forming an emulsion of the composition obtained in step 2 in water by mixing said composition in a high-shear mixer with water containing an emulsifying agent,
4. removing said solvent from the resulting emulsion, and
5. mixing with the resulting latex a resin component as defined in (B) above, the weight ratio of the elastomer to the resin component being about 50:50 to 91:9.

DESCRIPTION OF PREFERRED EMBODIMENTS

In component B of the novel adhesive composition, a preferred aldehyde is formaldehyde. Also very useful is a combination of formaldehyde with up to about 40%, based on the total mols of aldehyde, of an aldehyde having 3–6 carbon atoms; thus, the component B resin can be made in the manner described in U.S. Pat. No. 3,437,610.

In forming the resin B component of the composition, one can use an aqueous solution of formaldehyde or a material furnishing formaldehyde such as paraformaldehyde; other useful aldehydes are known in the art. Although component B is initially water soluble, it is capable of being converted at an elevated temperature (e.g. at about 125°–175°C) to a substantially infusible insoluble resin. The component B resin (known in the art as an A-stage resin) can be formed by a condensation reaction carried out under basic conditions (e.g. at a pH of about 8–9) or under acidic conditions (e.g. at a pH of about 3–4). When made at a pH below 7, the resin solution is preferably made alkaline with sodium hydroxide or zinc oxide or the like before use. the resin can be formed in an aqueous medium at a temperature of about 24°–34°C or higher.

The component C elastomer can be selected from the ethylene copolymers which are known to be useful in latex adhesives. Especially useful are ethylene/1,4-hexadiene copolymers and terpolymers of ethylene, propylene and 1,4-hexadiene. Also useful are closely related elastomers wherein the 1,4-hexadiene is replaced with 5-ethylidene-2-norbornene or other nonconjugated hydrocarbon dienes. Among the useful component C elastomers are those described in U.S. Pat. Nos. 3,000,866, 3,093,620, 3,093,621 and 3,151,173; also in U.S. Pat. No. 3,365,418 (e.g. column 4, line 69 to column 5, line 43).

An especially preferred elastomer is an ethylene/1,4-hexadiene copolymer in which each 100 parts by weight of the copolymer contains about 60–84 parts of ethylene and 16–40 parts of 1,4-hexadiene. This copolymer preferably has an unsaturation value of about 2–4 in many uses of the invention.

Another very useful elastomer is a terpolymer containing in each 100 parts by weight thereof about 50–62 parts of ethylene, 20–42 parts of propylene and 4–16 parts of 1,4-hexadiene. It is preferred in many uses of the invention that the terpolymer has an unsaturation value of about 0.25-2. The term "unsaturation value" as used herein means the number of gram moles of carbon-carbon double bonds per kilogram of elastomer.

The elastomers described in the previous two paragraphs are especially useful when making the composition by the process set forth above wherein the elastomer is dry-milled with carbon black.

Also useful as component C is a copolymer of
a. about 25-75% by weight of ethylene units,
b. about 0.01-0.5 gram mole per kilogram of copolymer of units derived from a $C_5$ to $C_{110}$ polyolefin containing two polymerizable double bonds, or about 0.01-0.10 gram mole/kilogram of a $C_{20}-C_{62}$ di-ester of 2-(hydroxyalkyl or alkenyl)-5-norbornene, the amount of (b) not to exceed 15% by weight of the copolymer,
c. sufficient units of a non-conjugated diene containing only one polymerizable double bond to provide 0.1 to 4.0 gram moles/kilogram of carbon-carbon double bonds derived from the diene, and
d. the remainder of the said copolymer being propylene units.

This copolymer is described in greater detail in Canadian Pat. No. 897,895, granted Apr. 11, 1972, which corresponds to U.S. Pat. application Ser. No. 38,862 filed May 19, 1970 by Brodoway, Campbell and Thurn.

Other useful component C elastomers include: Side-chain halogen-substituted ethylene copolymers as described in Canadian Pat. No. 762,535; ethylene-dicyclopentadiene copolymers as described in Canadian Pat. No. 826,733; and copolymers of ethylene and norbornene compounds as described in Canadian Pat. No. 865,061 wherein the unsaturation value is relatively high (e.g. about 5-60).

Elastomer C is present in the aqueous continuous phase of the composition as dispersed latex particles. The elastomer usually has an "inherent viscosity" of at least 0.5, preferably about 2-3, as measured on a solution of 0.1 gram of elastomer in 100 ml. of tetrachloroethylene at 30°C.

Usually the best results (e.g. best adhesion) are obtained when the weight ratio of elastomer component C to resin component B is about 80:20 to 86:14. Also it is usually best to employ a weight ratio of carbon black component D to elastomer component C of about 30:70 to 40:60.

Component D is a reinforcing type of carbon black, for example a carbon black within the ASTM designation $N_1$ to $N_7$. The most beneficial results are usually obtained according to the present invention when the carbon black is milled or blended with the elastomer in the substantially dry state (in the complete or almost complete absence of any liquid), particularly when using the elastomers referred to above as especially useful. This blending operation is set forth as step (1) of the novel process described above.

Step 2 of the process as shown above comprises mixing the resulting milled blend with an organic solvent for the elastomer. A solvent is used which undergoes no harmful reaction with the other components of the composition. The solvent is preferably volatile enough so that it can readily be removed at a temperature below 75°C.

In step 3, an oil-in-water emulsion is formed by mixing the resulting liquid composition in a high-shear mixer with water containing a suitable amount of an emulsifying agent, for example about 1-10 percent based on the weight of elastomer present. This can be done for example at a temperature of about 15°-75°C. Among the useful emulsifying agents are the sodium salts of long-chain alkyl-substituted aryl sulfonic acid or long-chain alkyl sulfonic acids or long-chain alkyl hydrogen sulfates or mono- and di-long-chain alkyl ethers of polyethylene ether glycol. The water can also contain a suitable colloidal stabilizer, for example one or more members of the group consisting of ammonium caseinate, sodium and ammonium polyacrylates, methyl cellulose, alginates, starch and polyvinyl alcohol. One can also add an emulsification modifier, for example isopropanol, which is soluble in both phases of the emulsion.

Step 4 comprises removing the organic solvent from the emulsion (e.g. at a temperature of about 40°-72°C) to form a latex. Subatmospheric pressure can be used if desired to enhance solvent removal. Step 5 comprises adding to the latex a resin component (component B) as described above.

In some applications, suitable results are obtained when the dry-blending of the carbon black is replaced with a liquid blending technique, for example by mixing an aqueous dispersion of the carbon black with a latex of the polymer.

The adhesive composition can also contain one or more additives such as those known to be useful in polymeric latex compositions, for example curing agents, coloring agents, antifreeze agents and stabilizers. An alkaline metal hydroxide can be present to provide the desired pH, for example about 7.5-9.0.

The total solids content of the novel composition is usually about 10-40 percent, preferably about 15-30 percent, based on the weight of the composition. The best solids content for a particular application will of course depend on such factors as how many coats of composition it is convenient to apply to the substrate, and how heavy a dried adhesive layer is needed.

The composition can be applied to any fibrous substrate known to be useful as a reinforcing component of a reinforced rubber article, including cords and fabrics made of organic or inorganic fibers or blends thereof. The composition can be applied to the fibrous substrate by any suitable known coating method, for example by dipping, spreading, spraying, roller-coatng, brushing or extruding. A two- or three-stage heat zone can be used for rapid drying of the adhesive coating. When put to use, the adhesive-coated fibrous reinforcing component is maintained in contact with a layer of curable rubber composition while applying heat and pressure to the assembly until the rubber is cured.

If the adhesion obtained with a particular subtrate is not as great as desired for a certain end use, the adhesion can often be improved by subjecting the substrate to known adhesion-enhancing treatments before applying the present adhesive. It will be apparent that the cord or fabric substrate can be prime-coated with known primer compositions, although this will not usually be needed when the substrate is made of nylon or rayon. It is known that certain grades of glass fiber substrates are available from the fiber producer which are already treated with an adhesion-enhancing silane compound. U.S. Pat. No. 3,307,966 shows a primer composition for fibrous substrates made of polyesters or other materials. Known electrical discharge treatments can also be used to improve the adhesion of fibrous substrates to polymeric coatings.

The present adhesive composition is especially useful for providing a strong bond between reinforcing components made of nylon fibers and rubber compositions whose principal elastomer component is a terpolymer of ethylene, propylene and a diene. For example, automobile tires can be made from such rubber compositions and nylon tires cord coated with the novel composition which have excellent cord-to-rubber adhesion both in a dynamic adhesion test and in a static adhesion test. Also, when the nylon cord is replaced with rayon cord coated with the present composition, excellent adhesion is again obtained; and the harmful tendering of the rayon cord encountered with certain prior art bonding means (e.g. chlorine-liberating compositions) is eliminated. The composition also has beneficial utility in the manufacture of industrial belts, elastomer coated fabrics, rubber hose and the like.

EXAMPLE 1

This example, and the ones which follow, are given for the purpose of illustrating the invention. All quantities shown are on a weight basis unless otherwise indicated.

A tire cord adhesive of the present invention is prepared in this example. First an elastomeric terpolymer is provided; it is composed of 43.0 percent ethylene, 43.8 percent propylene and 13.2 percent 5-ethylidene-2-norbornene (unsaturation value about 1.0). Such a terpolymer can be made in solution by reacting the monomer mixture in tetrachloroethylene in the presence of a vanadium type coordination catalyst; and the solvent can then be removed. The terpolymer has an inherent viscosity of 2.31 and a Mooney viscosity of 54. The Mooney viscosity values given herein are at ML1 + 4/121°C.

A liquid/adhesive composition useful as a tire cord adhesive is prepared by (a) mixing 190 grams of the terpolymer with 3000 ml. of benzene and 450 ml of isopropanol to form a 6 percent solution of the terpolymer in the solvent mixture; (b) forming an emulsion of the terpolymer solution in water by mixing 1540 grams of the solution (which is at a temperature of 48°C) in a high-shear, high-speed turbine-stator or homogenizer type of mixer (e.g. an "Eppenbach HomoMixer" from Gifford-Wood Co.) with 770 grams of water containing 1.2 percent of an emulsifying agent (sodium lauryl sulfate), the water being gradually added to the terpolymer solution during high-shear mixing and the mixing being continued for 5 minutes after adding all the water; (c) removing the benzene and isopropanol in a distilling apparatus which is allowed to operate until the head temperature reaches about 99°C; (d) cooling the resulting latex to 23°C; (e) forming a more concentrated or creamed latex having a total solids content of about 50 percent by mixing with the step (d) latex 0.1 part of 1 percent sodium alginate for each 100 parts of water in the latex, allowing the composition to stand for 16 hours, removing the creamed latex which separates out, and further concentrating the creamed latex in a centrifuge; (f) adjusting the total solids content of the remaining latex to 41 percent by adding a small amount of water; (g) mixing 62.26 grams of the latex with 59.33 grams of distilled water at 24°C and cooling the diluted latex to 9°C; (h) adding slowly to the latex with stirring 2.84 grams of 28 percent aqueous ammonium hydroxide and stirring for another 5 minutes; (i) mixing with the resulting latex 28.88 grams of a resin component (resorcinol-formaldehyde resin solution) and stirring slowly for another three minutes, said resin component having a pH of about 7.2 and being the product of adding (while stirring) to 158.4 grams of distilled water at 24°C a 40.28 gram portion of a 1.67 percent aqueous sodium hydroxide solution and stirring for another minute, slowly adding 24.84 grams of resorcinol flakes and stirring for another 5 minutes, adding 36.36 grams of 37 percent aqueous formaldehyde solution and stirring for another two minutes, and allowing the composition to age without stirring for 6 hours; (j) aging the resin-modified latex at 24°C for 12 hours, the composition now having a pH of 10.2; (k) adding to the composition while stirring 38.3 grams of a 33.3 percent dispersion of SAF carbon black (a reinforcing type) in water containing a small amount of an anionic dispersing agent composed of highly purified partially desulfonated sodium lignosulfonate ("Marasperse" CB from Marathon Products Div. of American Can Co.); and (l) adding to the resulting composition 25.6 grams of distilled water. The weight ratio of carbon black to terpolymer in the composition is 33:67. The Marasperse CB can be replaced if desired with Marasperse N, which is purified sodium lignosulfonate.

The resulting composition has the utility described in the two paragraphs just prior to Example 1. It is very useful as a nylon tire cord adhesive; and it is useful as an adhesive for tire cords and fabrics made of fibers or filaments of other materials, for example polyesters, glass, steel, and rayon.

EXAMPLE 2

A composite reinforcing cord for use in the manufacture of rubber tires and the like is prepared by (1) providing a quantity of nylon tire cord made from continuous filament 66 nylon yarn having a denier of 1260 grams per 9000 meters by twisting one of these yarns in a ply twist (in the Z direction) and then bringing two ends of the resulting yarn together and applying a cord twist (in the S direction); (2) passing the cord at the rate of 20 yards per minute through a container of the adhesive composition prepared in Example 1 at a temperature of 25°C; (3) passing the coated cord through a 146°C heat zone for 2.6 minutes while the cord is stretched 1 percent; (4) passing the cord through a 215°C heat zone for 0.8 minute while the cord is stretched 12 percent; (5) passing the cord through a 204°C heat zone for 1.25 minutes while the cord is allowed to relax 2 percent; and (6) cooling the composite cord to 24°C and winding it on a storage spindle to await use in the manufacture of tires.

EXAMPLE 3

The coated tire cord prepard in prepared 2 is used in the manufacture of rubber tires as follows. A quantity of Carcass skim stock is prepared by first mixing the ingredients shown below in Formula 3.1 in a water-cooled intensive internal batch mixer known as a No. 11 "Banbury" Mixer (from Farrel Co. Div. of U.S. M. Corp.) using a ram pressure of 100 psi and a speed of 40 rpm. Ingredients 1–7 are added in the order shown; the mixer is closed and run until the temperature in the mixer reaches 121°C; ingredient No. 8 is added in small portions over a period of 10 minutes while the mixture is kept at about 113°C; then the completed Formula 3.1 composition is removed from the mixer and allowed to cool to 25°C.

FORMULA 3.1

| Ingredient No. |  | Parts |
| --- | --- | --- |
| 1 | Elastomer | 75 |
| 2 | Elastomer | 25 |
| 3 | Furnace black | 50 |
| 4 | Furnace black | 40 |
| 5 | Zinc oxide | 5 |
| 6 | Stearic acid | 1 |
| 7 | Isoprenoidal resin | 40 |
| 8 | Paraffinic oil | 40 |

Ingredient No. 1 is an elastomer terpolymer of 53% ethylene, 40% propylene and 7% 1,4-hexadiene; it has a Mooney viscosity of 70 and an inherent viscosity of about 3.0. Such a terpolymer can be made in solution by reacting the monomer mixture in tetrachloroethylene in the presence of a pre-mixed coordination catalyst formed by combining $VOCl_3$ with diisobutyl aluminum monochloride; then the solvent is removed.

Ingredient No. 2 is an elastomeric terpolymer of 59 percent ethylene, 36 percent propylene and 5 percent 1,4-hexadiene; it has a Mooney viscosity of 40; inherent viscosity is 2.2. Such a terpolymer can be made in solution by reacting the monomer mixture in tetrachloroethylene in the presence of a coordination catalyst formed in situ by combining $VCl_4$ and diisobutyl aluminum monochloride; hydrogen modification can be used as described in U.S. Pat. No. 3,051,690 for control of molecular weight.

Ingredient No. 3 is a high temperature, high abrasion furnace black known as HS-HAF black.

Ingredient No. 4 is a fine extrusion furnace black known as FEF black.

Ingredient No. 7 is Reichhold Chemicals Company's "Betaprene" H-100, which is understood to be the product of (a) adjusting the olefin-containing by-product of a hydrocarbon cracking process so that it contains about 6 percent by weight of each of 2-methyl-2-butene and dicyclopentadiene with the remainder characterized by substantially equal weight proportions of isoprene and piperylene, and (b) heating the mixture at about 70°–80°C in the presence of $AlCl_3$ until the reaction is substantially completed.

Ingredient No. 8 ("Sunpar" 2280 from Sun Oil Co.) is a paraffinic petroleum oil having a viscosity-gravity constant of about 0.796, a specific gravity at 60°F of 0.8916, a Saybolt viscosity at 210°F of 165 seconds and a flash point of 595°F.

The preparation of the skim stock is completed by mixing for a period of 1.25 minutes a quantity of the resulting Formula 3.1 composition in a Banbury Mixer operating at 28 rpm with the following curing agents: 1.5 phr (parts per hundred of elastomer present) of zinc dimethyldithiocarbamate, 1.5 phr of tetramethyl thiuram disulfide, 0.8 phr of 2,2'-dithiobisbenzothiazole and 3 phr sulfur ("Crystex" 90, a rubber compounding grade of amorphous sulfur from Stauffer Chem. Co.); passing the resulting mixture twice through a water-cooled two-roll rubber mill adapted to form a 0.5 inch thick rubber sheet; and cooling the resulting skim stock by passing it through an aqueous soap-stone dispersion, and then drying it.

Automobile tires are manufactured by combining the coated tire cord prepared in Example 2 with the skim stock prepared in the previous paragraph on a calendar whose rollers are at about 82°C; positioning the resulting composite material in the usual manner on a tire building durm and forming a green tire carcass drum; and, by a conventional tire building procedure, adding ethylene/propylene/diene rubber tread stock and curing the composite structure in a tire-curing press. The tire cord of each tire is now bonded to the rubber of the tire with a very durable bond.

EXAMPLE 4

A tire cord adhesive is prepared according to the novel process of this invention by (1) providing an elastomeric terpolymer of 53 percent ethylene, 40 percent propylene and 7 percent 1,4-hexadiene (same as Ingredient No. 1 of Formula 3.1 above); (2) uniformly blending about 50 parts of SAF reinforcing carbon black with 100 parts of the terpolymer provided in Step 1 by means of a two-roll rubber mill, the weight ratio of the carbon black to the terpolymer in the resulting dry-milled blend being about 33:67; (3) in the manner described in Step (a) of Example 1, mixing 190 grams of the milled blend with an organic solvent for the terpolymer until a liquid solution composition by mixing it with water containing an emulsifying agent in the manner described in Step (b) of Example 1; (5) removing the solvent from the emulsion and forming a latex composition in the manner described in Steps (c) through (h) of Example 1; (6) adding a resorcinol-formaldehyde resin (enough to give the same ratio of resin to elastomer as in Example 1) and aging the latex composition as described in Steps (i) and (j) of Example 1; and (7) mixing about 50 parts of water with the resulting composition.

The resulting adhesive composition, which has the utility described in the two paragraphs just before Example 1, is useful for obtaining a strong bond between rubber and tire cords or fabrics made of nylon, polyester, glass, steel, rayon and the like.

Using the adhesive composition prepared above in place of the Example 1 composition, a composite tire cord is made in the manner described in Example 2. The resulting adhesive coated tire cord is used for the manufacture of automobile tires by the procedure described in Example 3. The cord content of each tire obtained is bonded to the rubber of the tire with a surprisingly durable bond. Evidence of the unexpected strength of the bond can be seen below.

A strip adhesion test at 140°C is made as described below with a coated tire cord prepared in the manner described above in Example 4 except there is no carbon black in the adhesive composition. An adhesion value of 0.85 pound is obtained.

Then a strip adhesion test at 140°C is made with the coated tire cord prepared in Example 4. It is expected that a lower adhesion value will be obtained with this material in this severe test because the large amount of carbon black present (carbon black: elastomer ratio of about 33:67) will probably reduce the bonding efficiency of the polymeric adhesive. Quite unexpectedly, however, the bond is over twice as strong. The adhesion value is 2.7 pounds, or about 220 percent greater than with the carbon black-free adhesive. When the test is repeated using an adhesive containing only a small amount of carbon black (e.g. 6 phr, or a carbon black: terpolymer ratio of about 5.7:94.3), the adhesion value is not much different from that obtained with the carbon black-free adhesive.

A useful strip adhesion test is described in "Rubber Chemistry and Technology" Volume 42, February 1969, pages 159–251. The strip adhesion test used in the present examples is performed by placing 12-inch samples of the cord on a 10-inch by 11-inch steel plate, the cord samples being one inch apart, parallel with each other and held flat under tension; placing the plate holding the samples in a curing mold; covering the samples with a sheet of skim stock having a thickness of 0.125 inch and prepared as described in Example 3 except the two-roll mill is set to form a thinner sheet; subjecting the composite structure to a pressure of 360 psi and a temperature of 166°C for 20 minutes between the platens of a curing press; removing the cured sheet and cutting it into test specimens parallel to the cords so that each specimen contains one cord. The strip adhesion value is the force required to strip the cord from the cured specimen while the specimen is at a specified temperature, for example at 140°C as employed above.

When the strip adhesion tests described above are repeated except the specimens are at 25°C, the adhesion value obtained with the carbon black-free adhesive is 2.0 pounds, whereas the value obtained with the Example 4 product is 3.7 pounds, or about 85 percent greater.

An H-pull adhesion test at 140°C made as described below with the cord having no carbon black in the adhesive coating gives a value of 10.3 pounds. The same test made with the Example 4 cord having a high carbon black content in the adhesive coating gives a value of 15.2 pounds, or about 47 percent greater.

The H-pull adhesion test in the present examples is performed in the manner described in ASTM Method D 2138-62T. This test is another well-known means of measuring cord-to-rubber adhesion. In preparing the test specimens, after combining the cords with the skim stock composition of Example 3, the composite structure is subjected to a pressure of 550 psi and a temperature of 166°C for 25 minutes.

EXAMPLE 5

The strip adhesion test at 140°C is made with a coated tire cord prepared in the manner described in Example 2 except the adhesive composition contains no carbon black. The adhesion value obtained is 1.7 pounds. When this test is repeated using the coated cord prepared in Example 2, the adhesion value is 3.5 pounds; surprisingly enough, with the high carbon black content of the Example 2 adhesive coating, the cord-to-rubber bond is 106 percent stronger.

When the strip adhesion tests described in the previous paragraph are repeated at 25°C, the bond strength with the carbon black-free adhesive is 2.9 pounds, whereas the bond strength with the Example 2 adhesive is 3.8 pounds, about 31 percent greater.

When the H-pull adhesion test at 140°C is made with the coated cord samples described in the first paragraph of Example 5, the bond strength with the carbon black-free adhesive is 10.4 pounds, while the bond strength with the Example 2 adhesive is 17.6 pounds, or about 69 percent greater.

A two-ply strip dynamic residual adhesion test as described below is performed with two-ply cured composite structures made from the coated cord of Example 2 and the skim stock composition of Example 3. The bond strength value in pounds per linear inch for the unflexed plies is 42; for the flexed plies it is 38.3. Moreover, the cords unexpectedly remain firmly fixed in the rubber matrix after ply separation. When the test is repeated using samples containing cord coated with one of the best prior art cord adhesives based on chlorosulfonated polyethylene and resorcinol-formaldehyde resin, and bond strength is considerably less in the flexed and unflexed plies. Furthermore, the cords come loose in the flexed portion instead of remaining fixed in the rubber matrix after ply separation.

A useful dynamic adhesion test is described in the publication mentioned above regarding the strip adhesion test. The dynamic adhesion test in this example is carried out by (1) providing a "Firestone" CF tester (Firestone Tire & Rubber Co.), which is a Model Z "Scott" Flex tester equipped with an oven; this Scott tester (sometimes called Flexometer Tester or flexing machine) is a well-known apparatus for carrying out the flexing procedure described here, and it is sold by the Scott Div. of Precision Scientific Co.; (2) providing properly prepared cured two-ply test specimens which have been conditioned at 24°C and 55 percent relative humidity and which have a width of one inch and a length of nine inches, the long dimension being parallel to the cords; (3) bending the specimens around a 0.75 inch hub whose arc of contact is about 135° and gripping the ends of the specimens by clamps adapted to oscillate the specimens up and down a distance of 2.625 inches in each direction by means of rocker arms; (4) flexing the specimens over the hub while they are pulled taut at 150 pounds tension by a weight on the loading lever, thereby compressing the specimen's inner ply and creating a shearing action between the plies, and continuing to oscillate each specimen at 250 cycles per minute for a total of 200,000 cycles; and (5) measuring the force required to separate the plies by means of an Instron Tensile Tester equipped with a "D" tensile cell and type 3C Instron clamps having 1-inch by 1.5-inch serrated faces, the 1.5-inch direction being verticle, and using a crosshead speed of 5 inches per minute and a chart speed of 2 inches per minute. Each specimen provided in Step (2) has been cured in a curing press at about 150°C/245 psi for 40 minutes, has a thickness of 140 mils (0.140 inch), and is made up of two plies bonded together, each ply being 70 mils thick and containing 23 ends per inch of the coated cord within the cured Example 3 skim stock composition. Prior to curing, the skim stock is mounted on a lathe and the cord is wound onto it under a tension of 120 grams.

EXAMPLE 6

A coated tire cord is prepared in the manner described in Example 2 except the terpolymer of the adhesive coating in the present example is the same as Ingredient No. 1 of Formula 3.1 above. The adhesive composition applied to the cord has substantially the same formula as that of Example 4. The only significant difference between the two compositions is the way in which the carbon black is added. In the present example it is added as an aqueous dispersion, and in Example 4 it is dry milled with the terpolymer.

The H-pull adhesion test at 140°C is made with the Example 6 coated cord. The adhesion value is 12.5 pounds, which is over 21 percent greater than when no carbon black is present (10.3 pounds). This is a very worthwhile beneficial result in itself. However, the adhesion value obtained on this test in Example 4 is 15.2, or over 21 percent greater. Thus, the dry-mill blending method of adding carbon black used in Example 4 provides a surprising beneficial result compared with the aqueous blending method used in Example 6.

The strip adhesion test at 25°C made with the Example 6 coated cord gives an adhesion value of 2.7 pounds, which is well above that obtained when no carbon black is present. However, the adhesion value obtained on this test in Example 4 is 3.7 pounds, or about 37 percent greater because of the dry mill carbon black blending method.

The H-pull adhesion test at 25°C made with the Example 6 coated cord gives an adhesion value of 29.1 pounds, which is about 16 percent greater than when no carbon black is present in the coating (25.1 pounds). When a small amount of carbon black outside the present invention is present in the coating, namely 6 phr (parts carbon black per hundred of terpolymer), giving a carbon black: terpolymer ratio of about 5.7:94.3, the adhesion value is 25.3 pounds. This value is about the same as with the carbon black-free composition, the difference being less than 1 percent. Thus, a surprising improvement in adhesion is obtained with the carbon black content used in the present invention.

The strip adhesion test at 140°C made with the Example 6 coated cord except only 6 phr of carbon black is present in the coating gives an adhesion value of 1.3 pounds. When 100 phr of carbon black is present (carbon black: terpolymer ratio of 50:50), the adhesion value is 3.5 pounds, or about 190 percent greater than with 6 phr of carbon black.

EXAMPLE 7

A coated tire cord is prepared in the manner described in Example 4 except the terpolymer of Step (1) is an elastomeric terpolymer of 60 percent ethylene, 36 percent propylene and 4 percent 1,4-hexadiene, the elastomer having an unsaturation value of 0.49, a Mooney viscosity of about 58, and an inherent viscosity of 2.39; and 60 parts of carbon black are used in Step (2), giving a carbon black: terpolymer ratio of 37.5:62.5.

The strip adhesion test at 140°C made with the Example 7 coated cord gives a value of 5.8 pounds; this is 190 percent greater than the value obtained (2.0 pounds) when the dry mill carbon black blending method used in Example 7 is replaced with the aqueous dispersion method of adding carbon black used in Examples 1 and 6 to make the Example 7 adhesive.

The H-pull adhesion test at 25°C made with the Example 7 coated cord gives a value of 37.6 pounds; this is 40 percent greater than the value obtained (26.9 pounds) when the dry blending method of adding carbon black is replaced with the aqueous dispersion method.

EXAMPLE 8

A coated tire cord is prepared in the manner described in Example 4 except the terpolymer of Step (1) is replaced with an elastomeric copolymer of about 70% ethylene and 30% 1,4-hexadiene, this elastomer having an unsaturation value of 3.0, a Mooney viscosity (ML-4/100°C) of about 24, and an inherent viscosity of 1.3; also, 60 parts of carbon black are used in Step (2), giving a carbon black: elastomer ratio of about 37.6:62.4.

The elastomeric copolymer can be prepared in the manner described in U.S. Pat. No. 3,365,418 Example 1 Part (B), the catalyst being a mixture of vanadium tris(acetylacetonate) and diisobutyl aluminum monochloride.

The H-pull adhesion test at 25°C made with the Example 8 coated cord gives a value of 41 pounds. At 140°C, the H-pull adhesion value is 19.7 pounds. The strip adhesion test at 25°C made with the Example 8 coated cord gives a value of 7 pounds. At 140°C the strip adhesion value is 8 pounds. Thus, the cord-to-rubber adhesion is unexpectedly high as measured by both test methods at both temperatures. The Example 8 composition has utility as described in the last two paragraphs just prior to Example 1.

I claim:
1. A liquid adhesive composition having a total solids content of about 10–40% by weight prepared by
   1. dry milling an elastomer selected from the group consisting of copolymers of about 60–84% by weight of ethylene and about 16–40% by weight of 1,4-hexadiene having an unsaturation value of about 2-4 and copolymers of about 50–62% by weight of ethylene, about 20–42% by weight of propylene and about 4–16% by weight of 1,4-hexadiene or 5-ethylidene-2-norbornene having an unsaturation value of about 0.25–2 with a reinforcing carbon black until the carbon black is substantially uniformly dispersed in the elastomer, the weight ratio of the carbon black to the elastomer being about 25:75 to 50:50,
   2. mixing the resulting milled blend with an organic solvent for the elastomer until the elastomer is in solution in the solvent and a liquid composition is formed,
   3. forming an emulsion of the composition obtained in step 2 in water by mixing said composition in a high-shear mixer with water containing an emulsifying agent,
   4. removing said solvent from the resulting emulsion, and
   5. mixing with the resulting latex a resorcinol-aldehyde resin component selected from the group consisting of a mixture of resorcinol and an aldehyde capable of forming a heat-hardenable resin, the resorcinol: aldehyde molar ratio being about 1:0.05 to 1:2 and a heat-hardenable resin made from said mixture the weight ratio of the elastomer to the resin being about 50:50 to 91:9.

2. A composition according to claim 1 wherein the aldehyde of said resin component is selected from the group of formaldehyde and combinations of formaldehyde with up to about 40%, based on the total mols of aldehyde, of an aldehyde having 3–6 carbon atoms.

3. A composition according to claim 1 wherein the weight ratio of said elastomer to said resin is about 80:20 to 86:14.

4. A composition according to claim 1 wherein the weight ratio of the carbon black to said elastomer is about 30:70 to 40:60.

5. A composite reinforcing cord for a rubber article comprising a fibrous cord substrate and an adherent dried coating thereon of the composition of claim 1.

* * * * *